United States Patent
Dreier et al.

(10) Patent No.: US 9,910,800 B1
(45) Date of Patent: Mar. 6, 2018

(54) UTILIZING REMOTE DIRECT MEMORY ACCESS ('RDMA') FOR COMMUNICATION BETWEEN CONTROLLERS IN A STORAGE ARRAY

(71) Applicant: Pure Storage, Inc., Mountain View, CA (US)

(72) Inventors: Roland Dreier, Mountain View, CA (US); Yan Liu, Mountain View, CA (US); Sandeep Mann, Fremont, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 15/697,802

(22) Filed: Sep. 7, 2017

Related U.S. Application Data (63) Continuation of application No. 14/817,168, filed on Aug. 3, 2015.

(51) Int. Cl.
  *G06F 13/00*    (2006.01)
  *G06F 13/28*    (2006.01)
  *G06F 12/02*    (2006.01)

(52) U.S. Cl.
  CPC ............ *G06F 13/28* (2013.01); *G06F 12/023* (2013.01); *G06F 2212/254* (2013.01)

(58) Field of Classification Search
  None
  See application file for complete search history.

(56) References Cited

U.S. PATENT DOCUMENTS

| | | | |
|---|---|---|---|
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | DeKoning et al. |

(Continued)

FOREIGN PATENT DOCUMENTS

| | | |
|---|---|---|
| EP | 0725324 A2 | 8/1996 |
| WO | WO-2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Cheng-Yuan Tseng
(74) *Attorney, Agent, or Firm* — Edward J. Lenart; Kennedy Lenart Spraggins LLP (57) ABSTRACT

Emulating a remote direct memory access ('RDMA') link between controllers in a storage array, including: inserting, into a buffer utilized by a direct memory access ('DMA') engine of a first storage array controller, a data transfer descriptor describing data stored in memory of the first storage array controller and a location to write the data to memory of the second storage array controller; retrieving, in dependence upon the data transfer descriptor, the data stored in memory of the first storage array controller; and writing the data into the memory of the second storage array controller in dependence upon the data transfer descriptor.

14 Claims, 5 Drawing Sheets

(56) References Cited

U.S. PATENT DOCUMENTS

| | | |
|---|---|---|
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,359 B1* | 9/2006 | Burton .................. H04L 49/358 370/463 |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,190,816 B2* | 5/2012 | Balasubramanian . G06F 3/0605 710/22 |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,832,216 B2* | 9/2014 | Bugge ....................... G06F 9/52 709/212 |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,134,922 B2 | 9/2015 | Rajagopal et al. |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,405,725 B2* | 8/2016 | Makhervaks ............. G06F 5/14 |
| 9,444,822 B1 | 9/2016 | Borowiec et al. |
| 9,507,532 B1 | 11/2016 | Colgrove et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0010612 A1* | 1/2004 | Pandya .................. H04L 29/06 709/230 |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |

(56) References Cited

U.S. PATENT DOCUMENTS

| | | |
|---|---|---|
| 2016/0352830 A1 | 12/2016 | Borowiec et al. |
| 2016/0352834 A1 | 12/2016 | Borowiec et al. |
| 2017/0039150 A1* | 2/2017 | Dreier .................. G06F 12/023 |

FOREIGN PATENT DOCUMENTS

| | | |
|---|---|---|
| WO | WO-2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security and Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 17 pages, URL: download.microsoft.com/download/E/A/E/EAE57CD1-A80B-423C-96BB-142FAAC630B9/Hybrid_Identity_Datasheet.pdf.

Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express as the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Jul. 18, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

\* cited by examiner

UTILIZING REMOTE DIRECT MEMORY ACCESS ('RDMA') FOR COMMUNICATION BETWEEN CONTROLLERS IN A STORAGE ARRAY

CROSS-REFERENCE TO RELATED APPLICATION

This application is a continuation application of U.S. patent application Ser. No. 14/817,168, filed Aug. 3, 2015.

BACKGROUND OF THE INVENTION

Field of the Invention

The field of the invention is data processing, or, more specifically, methods, apparatus, and products for emulating a remote direct memory access ('RDMA') link between controllers in a storage array.

Description of Related Art

Modern storage systems can include many storage devices that are accessed via multiple controllers. Communication between the controllers may be facilitated through the use of special purpose adapters, cables, and other computer hardware. Such adapters, cables, and other computer hardware, however, are often expensive and consume valuable resources such as space, power, and the like. Furthermore, incorporating the controllers into a single form factor can make the inclusion of such adapters, cables, and other computer hardware impossible.

SUMMARY OF THE INVENTION

Methods, apparatuses, and products for emulating a remote direct memory access ('RDMA') link between controllers in a storage array, including: inserting, into a buffer utilized by a direct memory access ('DMA') engine of a first storage array controller, a data transfer descriptor describing data stored in memory of the first storage array controller and a location to write the data to memory of the second storage array controller; retrieving, in dependence upon the data transfer descriptor, the data stored in memory of the first storage array controller; and writing the data into the memory of the second storage array controller in dependence upon the data transfer descriptor.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
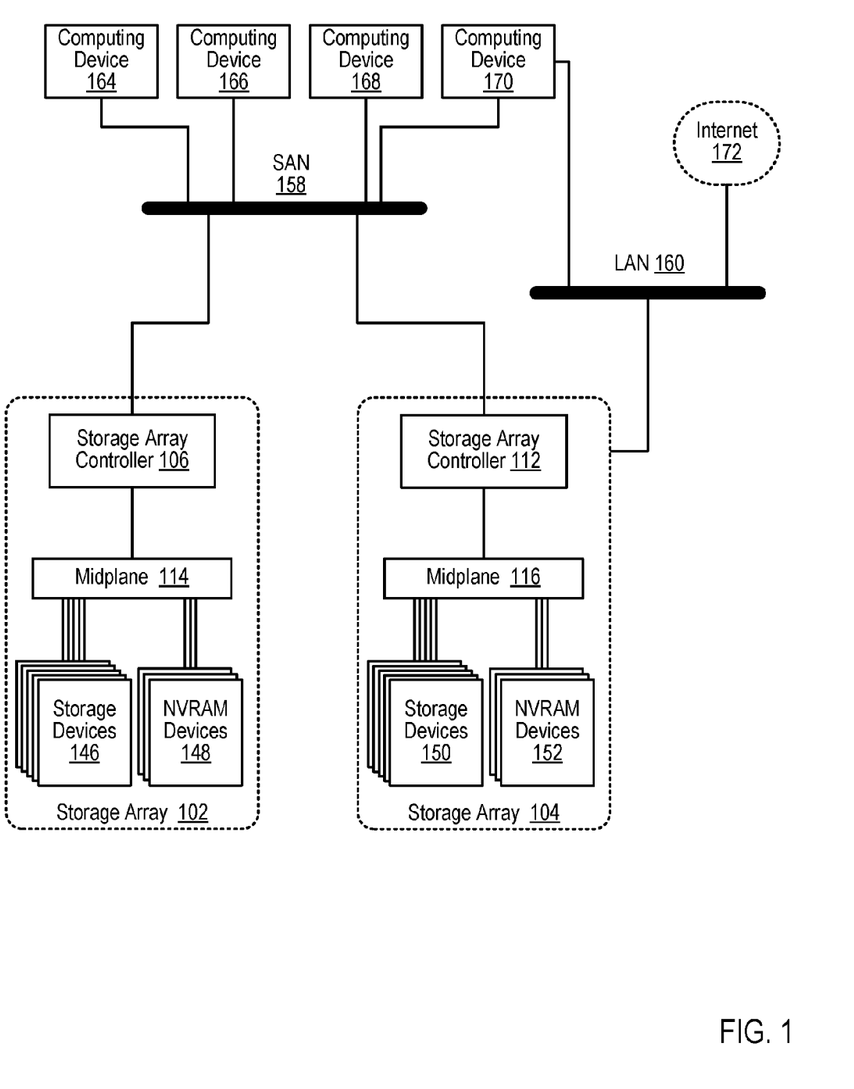
FIG. 1 sets forth a block diagram of a system configured for emulating an RDMA link between storage array controllers in a storage array according to embodiments of the present invention.

Example methods, apparatuses, and products for emulating an RDMA link between controllers in a storage array in accordance with the present invention are described with reference to the accompanying drawings, beginning with FIG. 1. FIG. 1 sets forth a block diagram of a system configured for emulating an RDMA link between controllers in a storage array according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to one or more storage arrays (102, 104) through a storage area network ('SAN') (158) as well as a local area network ('LAN') (160). The SAN (158) may be implemented with a variety of data communications fabrics, devices, and protocols. Example fabrics for such a SAN (158) may include Fibre Channel, Ethernet, InfiniBand, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one of many possible data communications couplings which may be implemented between a computing device (164, 166, 168, 170) and a storage array (102, 104), and readers will further appreciate that any other data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), and others as will occur to those of skill in the art.

The example storage arrays (102, 104) of FIG. 1 provide persistent data storage for the computing devices (164, 166, 168, 170). Each storage array (102, 104) depicted in FIG. 1 includes a plurality of storage array controllers (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing Redundant Array of Independent Drives (RAID') or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of non-volatile Random Access Memory ('NVRAM') devices (148, 152).

Each NVRAM device (148, 152) may be configured to receive, from the storage array controller (106, 112), data to be stored in the storage devices (146). Such data may originate from any one of the computing devices (164, 166, 168, 170). In the example of FIG. 1, writing data to the NVRAM device may be carried out more quickly than writing data to the storage device. The storage array controller (106, 112) may be configured to effectively utilize the NVRAM devices (148, 152) as a quickly accessible buffer for data destined to be written to the storage devices. In this way, the latency for write requests may be significantly improved relative to a system in which the storage array controller writes data directly to the storage devices (146, 150).

The NVRAM devices may be implemented with computer memory in the form of high bandwidth, low latency random access memory ('RAM'). In such an embodiment, each NVRAM device is referred to as 'non-volatile' because each NVRAM device may receive or include a unique power source that maintains the state of the RAM after main power loss to the NVRAM device (148, 152). Such a power source may be a battery, one or more capacitors, or the like. During the power loss, the NVRAM device (148, 152) may be configured to write the contents of the RAM to a persistent storage, such as the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives ("Flash drives"), and the like.

The storage array controllers (106, 112) of FIG. 1 may be configured for emulating an RDMA link between each other according to embodiments of the present invention. An RDMA link between the storage array controllers (106, 112) may be embodied, for example, as an InfiniBand link between the storage array controllers (106, 112). InfiniBand is a computer-networking communications standard used in high-performance computing. A physical InfiniBand link between two storage array controllers (106, 112) may be created, for example, through the use of cabling that runs between two storage array controllers (106, 112). Each of the storage array controllers (106, 112) may include a special purpose InfiniBand data communications adapter for receiving such cabling. Readers will appreciate that other RDMA links between storage array controllers (106, 112) may be emulated according to embodiments of the present invention. For example, the embodiments of the present invention may emulate an RDMA over Converged Ethernet ("RoCE") link between the two storage array controllers (106, 112), an iWARP link between the storage array controllers (106, 112), and so on.

The storage array controllers (106, 112) of FIG. 1 may be configured for emulating an RDMA link between each other according to embodiments of the present invention by inserting, into a buffer utilized by a DMA engine in a first storage array controller (106), a data transfer descriptor. The DMA engine may be embodied, for example, as an embedded DMA controller that resides within a computer processor in the storage array controller (106). The DMA engine may offload the responsibility of performing memory copies from the computer processor by performing direct memory accesses of main memory independently of any processor. Although the DMA engine may be embedded within a processor, the DMA engine may also be embodied as a special purpose controller that is mounted on the same motherboard as the computer processor, but physically separate from the computer processor itself.

The buffer utilized by each DMA engine may be embodied as a data structure used to store descriptors that generally describe data transfer operations to be performed by the DMA engine. For example, the buffer in the first storage array controller (106) may be used to store a data transfer descriptor that describes data stored in memory of the first storage array controller (106) and a location to write the data to memory of the second storage array controller (112). In such an example, the DMA engine may operate by retrieving descriptors from the buffer and performing the data transfer operations described by the descriptors.

The storage array controllers (106, 112) of FIG. 1 may be further configured for emulating an RDMA link between each other according to embodiments of the present invention by the first storage array controller (106) retrieving the data stored in memory of the first storage array controller (106). The memory of the first storage array controller (106) may be embodied, for example, as main memory in the form of RAM. A DMA engine of the first storage array controller (106) may retrieve the data stored in memory of the first storage array controller by performing a direct memory access where the DMA engine accesses the memory independently of any processor within the first storage array controller (106).

The DMA engine within the first storage array controller (106) may retrieve the data stored in memory of the first storage array controller (106) in dependence upon the data transfer descriptor. As described above, the data transfer descriptor may include information that describes data stored in memory of the first storage array controller (106). Such information that describes data stored in memory of the first storage array controller (106) can include, for example, the address of the data stored in memory of the first storage array controller (106), the size of the data stored in memory of the first storage array controller (106), and so on. The DMA engine within the first storage array controller (106) may be configured to utilize such information to retrieve the data stored in memory of the first storage array controller (106), for example, by reading an amount of data that is equal to the size of the data as described by the data transfer descriptor from the address of the data as described by the data transfer descriptor.

The storage array controllers (106, 112) of FIG. 1 may be further configured for emulating an RDMA link between each other according to embodiments of the present invention by writing the data into the memory of the second storage array controller (112). The data stored in memory of the first storage array controller (106) may be written into the memory of the second storage array controller (112) via a serial computer expansion bus that communicatively couples a processor in the first storage array controller (106) and a processor in the second storage array controller (112). Such a serial computer expansion bus may be embodied, for example, as a Peripheral Component Interconnect Express ('PCIe') Non-Transparent Bridge ('NTB') that communicatively couples the processor in the first storage array controller (106) and the processor in the second storage array controller (112). In such an example, the processor in the first storage array controller (106) and the processor in the second storage array controller (112) may each include a port that is connected to the PCIe NTB, such that bidirectional communication may occur directly between the processors. In such an example, a passive interconnect such as a passive midplane may physical reside between the processors, but no active components are required to route communications between the processors. Readers will appreciate that other physical interconnects between the storage array controllers (106, 112) may be utilized in accordance with embodiments of the present invention.

The DMA engine within the first storage array controller (106) may write the data into the memory of the second storage array controller (112) by performing a direct memory access of the memory in the second storage array controller (112). In such an example, the data may be written into the memory of the second storage array controller (112) in dependence upon the data transfer descriptor. As described above, the data transfer descriptor can include information describing a location to write the data to memory of the second storage array controller (112). The DMA engine of the first storage array controller (106) may utilize such information by writing the data into the memory location in the second storage array controller (112) that is described in the data transfer descriptor.

Although the example illustrated in FIG. 1 depicts an embodiment where a first storage array controller (106) is connected to a first set of storage devices (146) and NVRAM devices (148) by a first midplane (114) and a second storage array controller (112) is connected to a second set of storage devices (150) and NVRAM devices (152) by a second midplane (116), other arrangements are contemplated. For example, each of the storage array controllers (106, 112) may be connected to each of the storage devices (146, 150) and NVRAM devices (148, 152) by a single midplane. Readers will appreciate that the arrangement of computing devices, storage arrays, networks, and other devices making up the example system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Emulating an RDMA link between controllers in a storage array in accordance with embodiments of the present invention is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in emulating an RDMA link between controllers in a storage array according to embodiments of the present invention.

Figure 2:
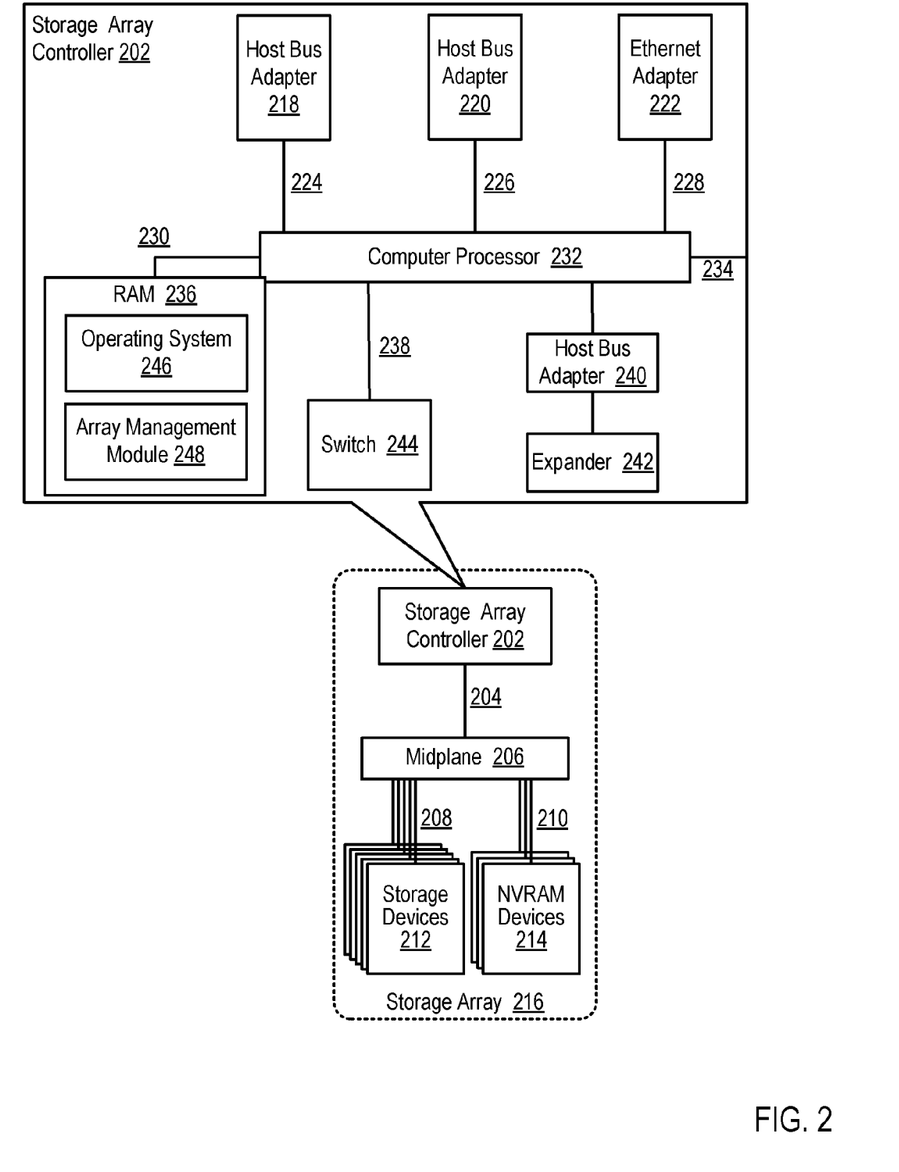
FIG. 2 sets forth a block diagram of a storage array controller useful in emulating an RDMA link between controllers in a storage array according to embodiments of the present invention.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more NVRAM devices (214) that are included as part of a storage array (216). The storage array controller (202) may be coupled to the midplane (206) via one or more data communications links (204) and the midplane (206) may be coupled to the storage devices (212) and the NVRAM devices (214) via one or more data communications links (208, 210). The data communications links (204, 208, 210) of FIG. 2 may be embodied, for example, as a PCIe bus.

The storage array controller (202) of FIG. 2 includes at least one computer processor (232) or 'CPU' as well as RAM (236). The computer processor (232) may be connected to the RAM (236) via a data communications link (230), which may be embodied, for example, as a high speed memory bus such as a Double-Data Rate 4 ('DDR4') bus.

Stored in RAM (214) is an operating system (246). Examples of operating systems useful in storage array controllers (202) configured for emulating an RDMA link between controllers in a storage array according to embodiments of the present invention include UNIX™, Linux™, Microsoft Windows™, and others as will occur to those of skill in the art. Also stored in RAM (236) is an array management module (248), a module of computer program instructions useful in emulating an RDMA link between controllers in a storage array according to embodiments of the present invention. The array management module (248) may be configured to perform steps such as: inserting, into a buffer utilized by a direct memory access ('DMA') engine of the storage array controller (202), a data transfer descriptor describing data stored in memory of the storage array controller (202) and a location to write the data to memory of a second storage array controller; retrieving, in dependence upon the data transfer descriptor, the data stored in memory of the storage array controller (202); writing the data into the memory of the second storage array controller in dependence upon the data transfer descriptor; and other steps that will be described in greater detail below as being performed by the storage array controller generally. Readers will appreciate that while the array management module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, a PCIe NTB interconnect, and so on.

Readers will recognize that these components, protocols, adapters, and architectures are for illustration only, not limitation. Such a storage array controller may be implemented in a variety of different ways, each of which is well within the scope of the present invention.

Figure 3:
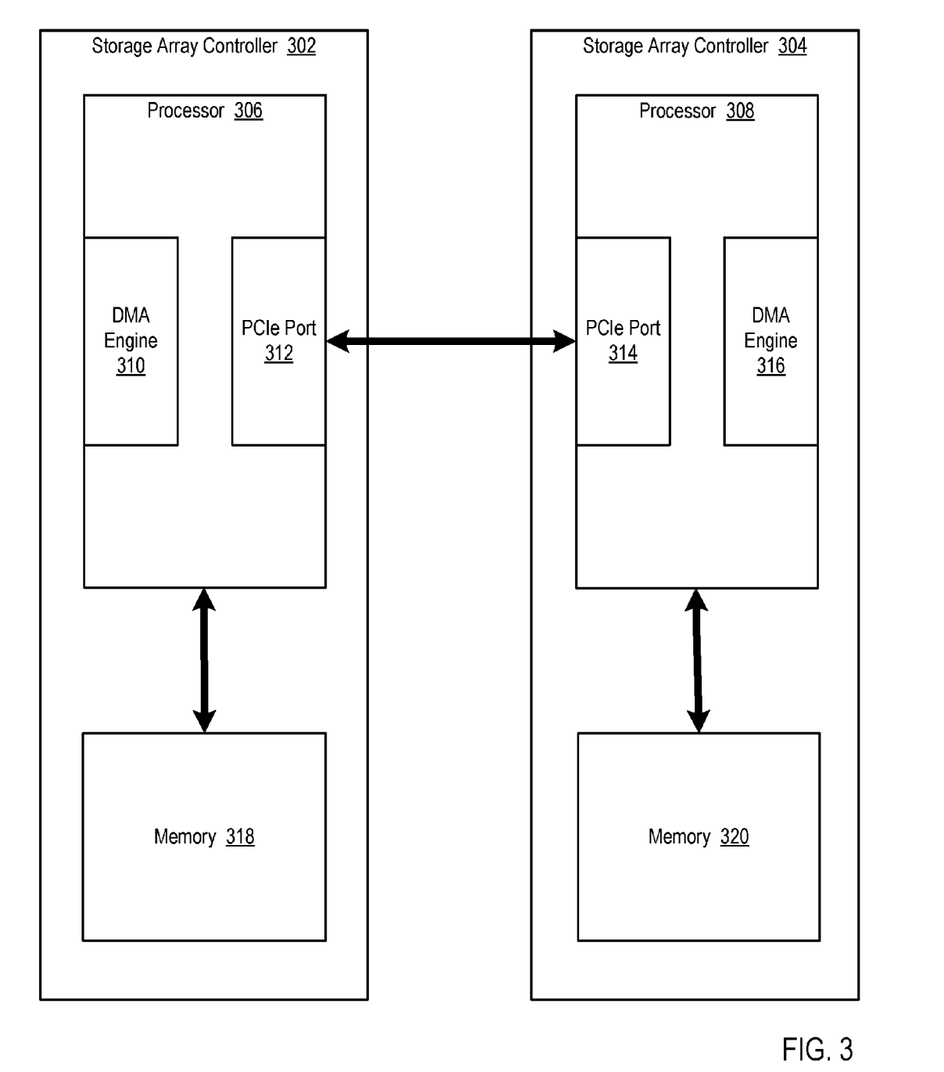
FIG. 3 sets forth a block diagram of a system for emulating an RDMA link between storage array controllers in a storage array according to embodiments of the present invention.

For further explanation, FIG. 3 sets forth a block diagram of a system for emulating an RDMA link between storage array controllers (302, 304) in a storage array according to embodiments of the present invention. Each of the storage array controllers (302, 304) depicted in FIG. 3 includes a processor (306, 308) and memory (318, 320), which may be embodied as RAM or other form of computer memory. In the example depicted in FIG. 3, the processors (306, 308) and the memory (318, 320) may be communicatively coupled via a memory bus, and other components not depicted here (e.g., a memory controller) may be included in the system to facilitate access of the memory (318, 320) by the processors (306, 308). Readers will appreciate that although each storage array controller (302, 304) depicted in FIG. 3 includes only a single processor (306, 308), each of the storage array controllers (302, 304) may include additional processors that can access the memory (318, 320).

In the example depicted in FIG. 3, each processor (306, 308) includes a DMA engine (310, 316). Each of the DMA engines (310, 316) may be embodied, for example, as special purpose computer hardware that enables the storage array controller (302, 304) to access main memory (318, 320) independently of the processor (306, 308) such that main memory (318, 320) can be accessed without the processor (306, 308) using programmed I/O. In the example depicted in FIG. 3, the DMA engines (310, 316) are depicted as being incorporated into the processors (306, 308), although in other embodiments the DMA engines (310, 316) may be embodied as a standalone DMA controllers. Readers will appreciate that although each of the processors (306, 308) depicted in FIG. 3 includes only a single DMA engine (310, 316), each of the processors (306, 308) may include additional DMA engines.

In the example depicted in FIG. 3, each processor (306, 308) includes a PCIe port (312, 314). Each of the PCIe ports (312, 314) may be embodied, for example, as physical connectors that enable the processor (306, 308) to couple to a PCIe bus. Readers will appreciate that although each of the processors (306, 308) depicted in FIG. 3 includes only a single PCIe port (312, 314), each of the processors (306, 308) may include additional PCIe ports. Readers will further appreciate that the processors (306, 308) may include additional physical connectors such that each of the processors (306, 308) may be directly coupled to each other via other data communications links.

Figure 4:
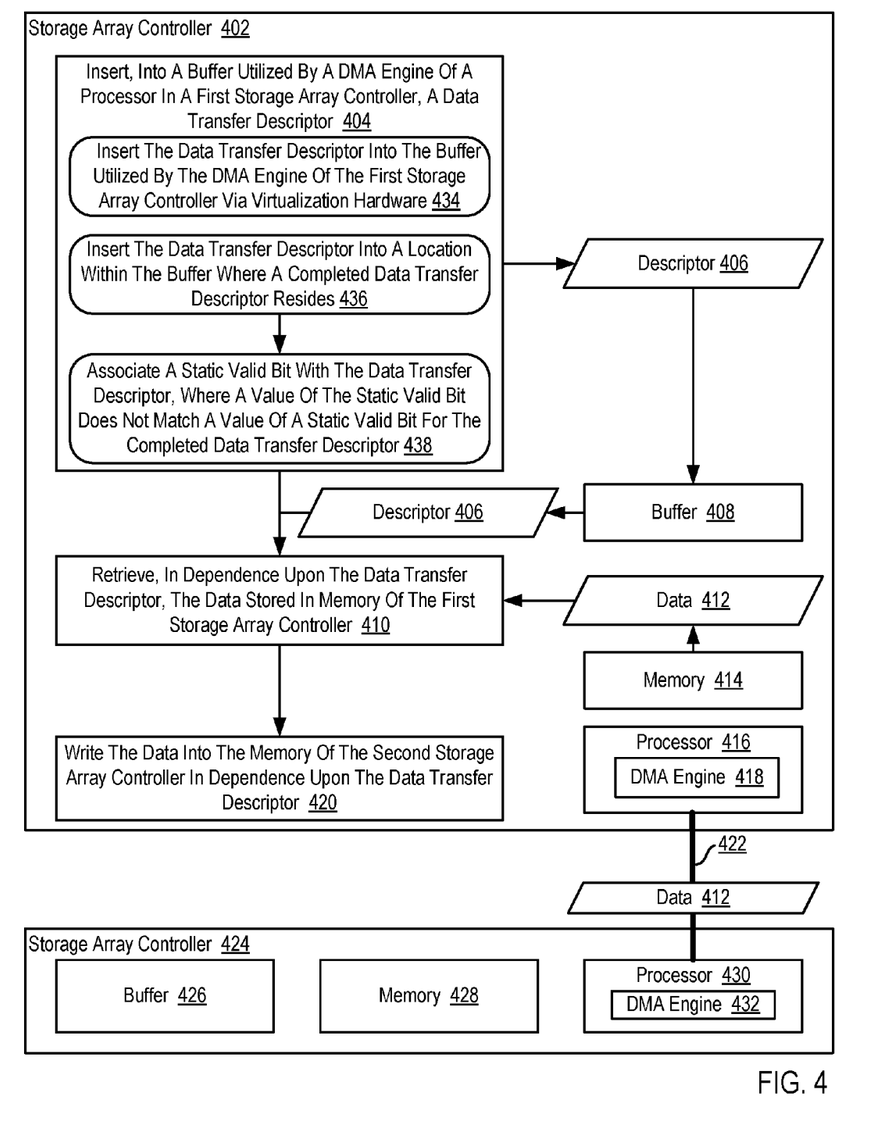
FIG. 4 sets forth a flow chart illustrating an example method for emulating an RDMA link between controllers in a storage array according to embodiments of the present invention.

For further explanation, FIG. 4 sets forth a flow chart illustrating an example method for emulating an RDMA link between controllers (402, 424) in a storage array according to embodiments of the present invention. An RDMA link between controllers (402, 424) may be embodied, for example, as an InfiniBand link between the two controllers (402, 424). InfiniBand is a computer-networking communications standard used in high-performance computing. A physical InfiniBand link between two storage array controllers (402, 424) may be created, for example, through the use of cabling that runs between two storage array controllers (402, 424) and is coupled to a special purpose InfiniBand data communications adapter. Readers will appreciate that other RDMA links between controllers (402, 424) may be emulated according to embodiments of the present invention. For example, the embodiments of the present invention may emulate an RoCE link between the two controllers (402, 424), an iWARP link between the two controllers (402, 424), and so on.

The example method depicted in FIG. 4 includes inserting (404), into a buffer (408) utilized by a DMA engine (418) in a first storage array controller (402), a data transfer descriptor (406). The DMA engines (418, 432) of FIG. 4 may be embodied, for example, as embedded DMA controllers that offload the responsibility for performing memory copies from the processors (416, 430) by performing direct memory accesses of main memory (414, 428) independently of any processor (416, 430). Although the DMA engines (418, 432) of FIG. 4 are depicted as being embedded within the processors (416, 430) themselves, the DMA engines (418, 432) may also be embodied as controllers that are mounted on the same motherboard as the processors (416, 430) but physically separate from the processors (416, 430) themselves.

The buffers (408, 426) utilized by the DMA engines (418, 432) may be embodied as data structures used to store descriptors that generally describe data transfer operations to be performed by the DMA engines (418, 432). For example, the buffer (408) in the first storage array controller (402) may be used to store a data transfer descriptor (406) that describes data (412) stored in memory (414) of the first storage array controller (402) and a location to write the data (412) to memory (428) of the second storage array controller (424). In such an example, the DMA engines (418, 432) may operate by retrieving descriptors from the buffers (408, 426) and performing the data transfer operations described by the descriptors.

The example method depicted in FIG. 4 also includes retrieving (410) the data (412) stored in memory (414) of the first storage array controller (402). The memory (414) of the first storage array controller (402) may be embodied, for example, as main memory in the form of RAM. In the example method depicted in FIG. 4, the DMA engine (418) may retrieve (410) the data (412) stored in memory (414) of the first storage array controller (402) by performing a direct memory access where the DMA engine (418) accesses the memory (414) independently of the processor (416).

In the example method depicted in FIG. 4, the DMA engine (418) may retrieve (410) the data (412) stored in memory (414) of the first storage array controller (402) in dependence upon the data transfer descriptor (406). As described above, the data transfer descriptor (406) may include information that describes data (412) stored in memory (414) of the first storage array controller (402). Such information that describes data (412) stored in memory (414) of the first storage array controller (402) can include, for example, the address of the data (412) stored in memory (414) of the first storage array controller (402), the size of the data (412) stored in memory (414) of the first storage array controller (402), and so on. In the example method depicted in FIG. 4, the DMA engine (418) may be configured to utilize such information to retrieve (410) the data (412) stored in memory (414) of the first storage array controller (402), for example, by reading an amount of data that is equal to the size of the data (412) as described by the data transfer descriptor (406) from the address of the data (412) as described by the data transfer descriptor (406).

The example method depicted in FIG. 4 also includes writing (420) the data (412) into the memory (428) of the second storage array controller (424). In the example method depicted in FIG. 4, the data (412) stored in memory (414) of the first storage array controller (402) may be written (420) into the memory (428) of the second storage array controller (424) via a serial computer expansion bus (422) that communicatively couples the processor (416) in the first storage array controller (402) and a processor (430) in the second storage array controller (424). Such a serial computer expansion bus (422) may be embodied, for example, as a PCIe NTB that communicatively couples the processor (416) in the first storage array controller (402) and the processor (430) in the second storage array controller (424). In such an example, the processor (416) in the first storage array controller (402) and the processor (430) in the second storage array controller (424) may each include a port that is connected to the PCIe NTB, such that bidirectional communication may occur directly between the processors (416, 430). A passive interconnect such as a passive midplane may physically reside between the processors (416, 430), but no active components are required to route communications between the processors (416, 430). Readers will appreciate that other physical interconnects between the storage array controllers (402, 424) may be utilized in accordance with embodiments of the present invention.

In the example method depicted in FIG. 4, the DMA engine (418) may write (420) the data (412) into the memory (428) of the second storage array controller (424) by performing a direct memory access of the memory (428) in the second storage array controller (424). Because the first storage array controller (402) and the second storage array controller (424) are coupled for communications, for example, via a PCIe NTB, a DMA engine (418) within the first storage array controller (402) may be capable of writing data directly to memory (428) in the second storage array controller (424). In such an example, the data (412) may be written (420) into the memory (428) of the second storage array controller (424) in dependence upon the data transfer descriptor (406). As described above, the data transfer descriptor (406) can include information describing a location to write the data (412) to memory (428) of the second storage array controller (424). The DMA engine (418) may utilize such information by writing (420) the data (412) into the memory location in the second storage array controller (424) that is described in the data transfer descriptor (406).

In the example method depicted in FIG. 4, inserting (404) the data transfer descriptor (406) into the buffer (408) utilized by the DMA engine (418) in the first storage array controller (402) may be carried out, for example, by management software executing on the storage array controller (402) forming the data transfer descriptor (406) and inserting (404) the data transfer descriptor (406) into the buffer (408) according to a predetermined insertion policy. For example, if the buffer (408) utilized by the DMA engine (418) is a FIFO buffer, the data transfer descriptor (406) may be inserted (404) into the end of the buffer (408). Alternatively, if the buffer (408) utilized by the DMA engine (418) is a LIFO buffer, the data transfer descriptor (406) may be inserted (404) into the front of the buffer (408). In such an example, the management software executing on the storage array controller (402) may determine the appropriate location within the buffer (408) to insert (404) the data transfer descriptor (406) for subsequent processing by the DMA engine (418).

In the example method depicted in FIG. 4, inserting (404) the data transfer descriptor (406) into the buffer (408) utilized by the DMA engine (418) in the first storage array controller (402) may include inserting (434) the data transfer descriptor (406) into the buffer (408) utilized by the DMA engine (418) of the first storage array controller (402) via virtualization hardware. The virtualization hardware may be embodied, for example, as computing components that support I/O virtualization. Such computing components that support I/O virtualization can include an Input/Output Memory Management Unit ('IOMMU'), chipsets and BIOS that support virtualization technology, and so on.

In the example method depicted in FIG. 4, inserting (404) the data transfer descriptor (406) into the buffer (408) utilized by the DMA engine (418) in the first storage array controller (402) may alternatively include inserting (436) the data transfer descriptor (406) into a location within the buffer (408) where a completed data transfer descriptor resides. In the example method depicted in FIG. 4, the buffer (408) may be embodied as a circular buffer with a limited number of entries. As such, new data transfer descriptors may be inserted into the buffer (408) by overwriting a previous entry in the buffer (408).

In the example method depicted in FIG. 4, inserting (404) the data transfer descriptor (406) into the buffer (408) utilized by the DMA engine (418) in the first storage array controller (402) may also include associating (438) a static validity value with the data transfer descriptor (406). The static validity value may be embodied, for example, as a single bit value used to determine whether a particular data transfer descriptor in the buffer (408) has already been processed. For example, a value of '0' may indicate that the associated data transfer descriptor has not been processed while a value of '1' may indicate that the associated data transfer descriptor has been processed. Readers will appreciate that because the static validity value is 'static', the static validity value does not change. For example, when a data transfer descriptor is processed, the static validity value is not changed from '0' to '1'. Once the static validity value has been set, the static validity value that is associated with a particular data transfer descriptor does not change.

In the example method depicted in FIG. 4, the static validity value that is associated with the data transfer descriptor (406) that is inserted (404) into the buffer (408) does not match a static validity value for the completed data transfer descriptor. Consider the example described above in which the static validity value is embodied as a single bit value. Assume that in such an example, the buffer (408) is a circular buffer that can store 1024 data transfer descriptors. In such an example, the first 1024 data transfer descriptors may be written sequentially into the buffer (408), and each data transfer descriptor may be associated with a static validity value of '0', indicating that the associated data transfer descriptor has not been processed. As data transfer descriptors are processed, however, the static validity value of each data transfer descriptor is not changed from a '0' to '1', as such changes would consume processing cycles from the processor (416). Instead of changing each static validity value, when the buffer (408) is full and new data transfer descriptors are inserted (404) by overwriting already-processed data transfer descriptors, the meaning of the static validity values may be flipped. That is, when the buffer (408) is full and new data transfer descriptors are inserted (404) by overwriting already-processed data transfer descriptors, the meaning of the static validity values may be flipped such that a value of '0' may indicate that the associated data transfer descriptor has been processed while a value of '1' may indicate that the associated data transfer descriptor has not been processed. As such, each time a new data transfer descriptor is overwritten, the new data transfer descriptor will be associated with a static validity value that is different than the static validity value of the overwritten data transfer descriptor.

Figure 5:
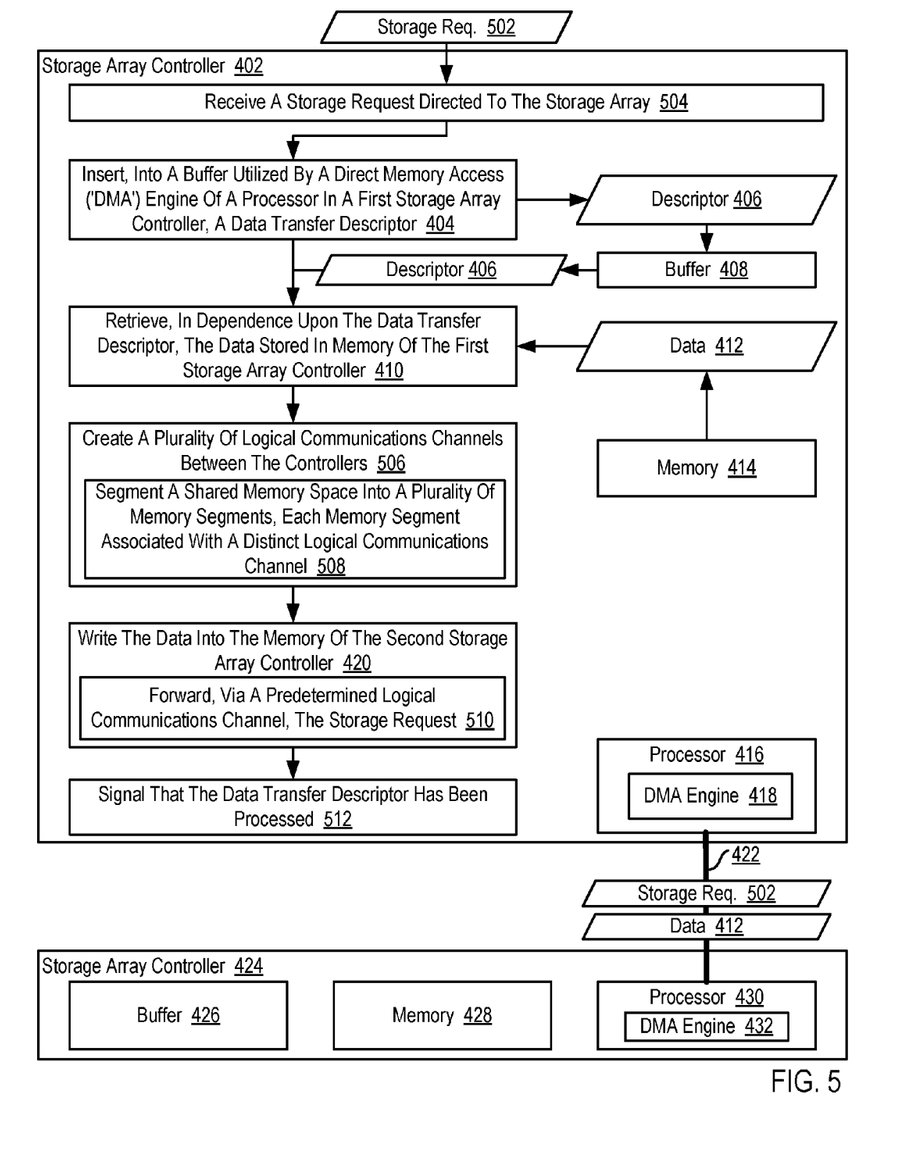
FIG. 5 sets forth a flow chart illustrating an example method for emulating an RDMA link between controllers in a storage array according to embodiments of the present invention.

For further explanation, FIG. 5 sets forth a flow chart illustrating an additional example method for emulating an RDMA link between controllers (402, 424) in a storage array according to embodiments of the present invention. The example method depicted in FIG. 5 is similar to the example method depicted in FIG. 4, as the example method depicted in FIG. 5 also includes inserting (404) a data transfer descriptor (406) into a buffer (408) utilized by a DMA engine (418) in a first storage array controller (402), retrieving (410) the data (412) stored in memory (414) of the first storage array controller (402), and writing (420) the data (412) into the memory (428) of the second storage array controller (424).

The example method depicted in FIG. 5 also includes creating (506) a plurality of logical communications channels between the first storage array controller (402) and the second storage array controller (424). In the example method depicted in FIG. 5, each of the logical communications channels between the first storage array controller (402) and the second storage array controller (424) may be reserved for sending specific data and messages between the first storage array controller (402) and the second storage array controller (424). For example, a first data communications channel may be utilized to forward storage requests received by the first storage array controller (402) to the second storage array controller (424) when the second storage array controller (424) is serving as the primary controller, a second data communications channel may be utilized to forward storage requests received by the second storage array controller (424) to the first storage array controller (402) when the first storage array controller (402) is serving as the primary controller, a third data communications channel may be utilized to transmit data between the storage array controllers (402, 424) that can be used when failing over from a primary controller to a secondary controller, and so on.

In the example method depicted in FIG. 5, creating (506) a plurality of logical communications channels between the first storage array controller (402) and the second storage array controller (424) can include segmenting (508) a shared memory space into a plurality of memory segments, where each memory segment is associated with a distinct logical communications channel. As described above, the first storage array controller (402) and the second storage array controller (424) may be coupled by a PCIe NTB. In such an example, some dedicated memory may be utilized to support communications over the PCIe NTB. Such dedicated memory that is used to support communications over the PCIe NTB may serve as shared memory that is segmented (508) into a plurality of memory segments, wherein each memory segment is associated with a distinct logical communications channel. In such a way, sending data over the first logical communications channel may be carried out by writing the data to the memory segment associated with associated with the first logical communications channel, sending data over the second logical communications channel may be carried out by writing the data to the memory segment associated with associated with the second logical communications channel, and so on.

The example method depicted in FIG. 5 also includes receiving (504) a storage request (502) directed to the storage array. The storage request (502) may be embodied, for example, as a request to read data from some memory location within the storage array or a request to write data to some memory location within the storage array. The storage request (502) may also be embodied, for example, as an 'extended copy request' where an initiator requests that storage array moves data internally (thereby replacing a sequence of read and write requests), as a 'reservation request' where an initiator reserves a volume so that if another initiator accesses the volume an error is returned, as a 'get LBA status request' that allows an initiator to query thin provisioning status, and so on.

In the example method depicted in FIG. 5, writing (420) the data (412) into the memory (428) of the second storage array controller (424) can include forwarding (510), from the first storage array controller (402) to the second storage array controller (424) via a predetermined logical communications channel, the storage request (502). Forwarding (510) the storage request (502) from the first storage array controller (402) to the second storage array controller (424) via a predetermined logical communications channel may be carried out, for example, by writing the storage request (502) into the memory segment associated with the predetermined logical communications channel.

The example method depicted in FIG. 5 also includes signaling (512) that the data transfer descriptor (406) has been processed. Signaling (512) that the data transfer descriptor (406) has been processed may be carried out, for example, by the DMA engine (418) writing the data transfer descriptor (406) to a designated memory location utilized to store the most recently completed data descriptor. In such an example, the designated memory location utilized to store the most recently completed data descriptor may be periodically polled to detect the presence of a new descriptor. In alternative embodiments, signaling (512) that the data transfer descriptor (406) has been processed may be carried out through the use of active messaging, by triggering an event, and so on.

Example embodiments of the present invention are described largely in the context of a fully functional computer system for emulating an RDMA link between controllers in a storage array according to embodiments of the present invention. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of emulating a remote direct memory access ('RDMA') link between controllers in a storage array, the method comprising:
    inserting, into a buffer utilized by a direct memory access ('DMA') engine of a first storage array controller, a data transfer descriptor describing data stored in memory of the first storage array controller and a location to write the data to memory of a second storage array controller;
    retrieving, in dependence upon the data transfer descriptor, the data stored in memory of the first storage array controller;
    segmenting a shared memory space into a plurality of memory segments to create a plurality of logical communications channels between the first storage array and the second storage array; and
    writing the data into the memory of the second storage array controller in dependence upon the data transfer descriptor.

2. The method of claim 1 further comprising:
    receiving, by the first storage array controller, a storage request directed to the storage array; and
    wherein writing the data into the memory of the second storage array controller in dependence upon the data transfer descriptor further comprises forwarding, from the first storage array controller to the second storage array controller via a predetermined logical communications channel, the storage request.

3. The method of claim 1 wherein inserting the data transfer descriptor into the buffer further comprises inserting the data transfer descriptor into the buffer utilized by the DMA engine of the first storage array controller via virtualization hardware.

4. The method of claim 1 further comprising signaling that the data transfer descriptor has been processed.

5. The method of claim 1 wherein inserting the data transfer descriptor into the buffer further comprises:
    inserting the data transfer descriptor into a location within the buffer where a completed data transfer descriptor resides; and
    associating a static validity value with the data transfer descriptor, wherein the static validity value does not match a static validity value for the completed data transfer descriptor.

6. A storage array controller for emulating a remote direct memory access ('RDMA') link between controllers in a storage array, the storage array controller comprising a computer processor, a computer memory operatively coupled to the computer processor, the computer memory having disposed within it computer program instructions that, when executed by the computer processor, cause the storage array controller to carry out the steps of:
    inserting, into a buffer utilized by a direct memory access ('DMA') engine of the storage array controller, a data transfer descriptor describing data stored in memory of the storage array controller and a location to write the data to memory of a second storage array controller;
    retrieving, in dependence upon the data transfer descriptor, the data stored in memory of the first storage array controller;
    segmenting a shared memory space into a plurality of memory segments to create a plurality of logical communications channels between the first storage array and the second storage array; and
    writing the data into the memory of the second storage array controller in dependence upon the data transfer descriptor.

7. The storage array controller of claim 6 further comprising computer program instructions that, when executed by the computer processor, cause the storage array controller to carry out the step of receiving a storage request directed to the storage array; and
    wherein writing the data into the memory of the second storage array controller in dependence upon the data transfer descriptor further comprises forwarding, to the second storage array controller via a predetermined logical communications channel, the storage request.

8. The storage array controller of claim 6 wherein inserting the data transfer descriptor into the buffer further comprises inserting the data transfer descriptor into the buffer utilized by the DMA engine of the storage array controller via virtualization hardware.

9. The storage array controller of claim 6 further comprising computer program instructions that, when executed by the computer processor, cause the storage array controller to carry out the step of signaling that the data transfer descriptor has been processed.

10. The storage array controller of claim 6 wherein inserting the data transfer descriptor into the buffer further comprises:
    inserting the data transfer descriptor into a location within the buffer where a completed data transfer descriptor resides; and
    associating a static validity value with the data transfer descriptor, wherein the static validity value does not match a static validity value for the completed data transfer descriptor.

11. A computer program product for emulating a remote direct memory access ('RDMA') link between controllers in a storage array, the computer program product disposed upon a non-transitory computer readable medium, the computer program product comprising computer program instructions that, when executed, cause a storage array controller to carry out the steps of:
    inserting, into a buffer utilized by a direct memory access ('DMA') engine of the storage array controller, a data transfer descriptor describing data stored in memory of the storage array controller and a location to write the data to memory of a second storage array controller;

retrieving, in dependence upon the data transfer descriptor, the data stored in memory of the first storage array controller;

segmenting a shared memory space into a plurality of memory segments to create a plurality of logical communications channels between the first storage array and the second storage array; and writing the data into the memory of the second storage array controller in dependence upon the data transfer descriptor.

12. The computer program product of claim 11 further comprising computer program instructions that, when executed, cause the storage array controller to carry out the step of receiving a storage request directed to the storage array; and wherein writing the data into the memory of the second storage array controller in dependence upon the data transfer descriptor further comprises forwarding, to the second storage array controller via a predetermined logical communications channel, the storage request.

13. The computer program product of claim 11 wherein inserting the data transfer descriptor into the buffer further comprises inserting the data transfer descriptor into the buffer utilized by the DMA engine of the storage array controller via virtualization hardware.

14. The computer program product of claim 11 further comprising computer program instructions that, when executed, cause the storage array controller to carry out the step of signaling that the data transfer descriptor has been processed.

* * * * *